United States Patent
Rompel et al.

(10) Patent No.: US 7,658,136 B2
(45) Date of Patent: Feb. 9, 2010

(54) HOLE SAW BLADE

(75) Inventors: Markus Rompel, Runkel/Schadeck (DE); Malek George, Valrico, FL (US); Rickey Thomas, Manchester, MD (US)

(73) Assignee: Black & Decker Inc., Newark, DE (US)

( * ) Notice: Subject to any disclaimer, the term of this patent is extended or adjusted under 35 U.S.C. 154(b) by 378 days.

(21) Appl. No.: 11/023,122

(22) Filed: Dec. 22, 2004

(65) Prior Publication Data

US 2006/0130629 A1    Jun. 22, 2006

(51) Int. Cl.
*B23D 61/12*    (2006.01)

(52) U.S. Cl. ............................. 83/835; 83/848; 83/851; 83/855

(58) Field of Classification Search .................. 83/835, 83/848, 846, 847, 851, 849, 850, 661, 833, 83/836, 839, 855, 663, 853, 852, 838; 76/112, 76/25.1, 29, 115, 403, 405.1; 408/206, 204, 408/1 R, 68, 64, 207, 209, 703

See application file for complete search history.

(56) References Cited

U.S. PATENT DOCUMENTS

| | | | |
|---|---|---|---|
| 85,417 A | 12/1868 | Andrews |
| 186,814 A | 1/1877 | Disston |
| 277,141 A | 5/1883 | Learned |
| 31,362 A | 8/1899 | McDonner |
| 1,919,748 A | 7/1933 | Roberts |
| 2,573,573 A | 10/1951 | Jenkins |
| 2,646,094 A | 7/1953 | Russell |
| 2,736,351 A | 2/1956 | Baker |
| 2,783,792 A | 3/1957 | Keesling |
| 2,784,751 A | 3/1957 | Alexander |
| 2,808,082 A | 10/1957 | Moretti et al. |
| 2,890,728 A | 6/1959 | Craven |
| 3,017,908 A | 1/1962 | Higbee |
| 3,028,889 A | 4/1962 | McCarty |
| 3,033,251 A | 5/1962 | Atkinson et al. |
| 3,056,437 A | 10/1962 | Mittins |
| 3,072,164 A | 1/1963 | Ramirez et al. |
| 3,109,464 A | 11/1963 | LaForce |
| 3,111,970 A | 11/1963 | Priest et al. |
| 3,186,726 A | 6/1965 | Wilhelm et al. |
| 3,314,456 A | 4/1967 | Craven |

(Continued)

FOREIGN PATENT DOCUMENTS

DE    923 089    3/1955

(Continued)

*Primary Examiner*—Ghassem Alie
(74) *Attorney, Agent, or Firm*—Scott B. Markow

(57) ABSTRACT

A hole saw has a cup shaped body with a base, and a cylindrical wall with an extending cutting edge. An arbor extends from base. A plurality of teeth are formed on the cutting edge. The teeth having a repeating first and second tooth form. The first tooth form has a rake face and relief face defining the cutting edge. The rake face and relief face are at a desired angle. A first gullet is continuous with the first rake face so that it has a desired depth. The second tooth form has a second rake face and second relief face. The faces are on a desired angle. A second gullet is continuous with the second rake face providing a second tooth height. The second tooth height is greater than the first tooth height.

14 Claims, 2 Drawing Sheets

U.S. PATENT DOCUMENTS

| | | | |
|---|---|---|---|
| 3,357,462 | A | 12/1967 | Craven |
| 3,374,815 | A | 3/1968 | Anderson, Jr. et al. |
| 3,416,579 | A | 12/1968 | Cowley |
| 3,477,479 | A | 11/1969 | Doty |
| 3,573,857 | A | 4/1971 | Sederberg |
| 3,609,056 | A * | 9/1971 | Hougen ............... 408/204 |
| 3,630,699 | A | 12/1971 | Catlin |
| 3,680,610 | A | 8/1972 | Lindgren |
| 3,695,344 | A | 10/1972 | Schnizler, Jr. |
| 3,716,916 | A | 2/1973 | Alexander |
| 3,803,681 | A | 4/1974 | Williams |
| 3,805,383 | A | 4/1974 | McNally |
| 3,925,867 | A | 12/1975 | Kareman |
| 3,964,163 | A | 6/1976 | Russo |
| 3,977,289 | A | 8/1976 | Tuke |
| 4,232,578 | A | 11/1980 | Stellinger et al. |
| 4,292,871 | A | 10/1981 | Neumeyer et al. |
| 4,345,499 | A | 8/1982 | Ross |
| 4,784,033 | A | 11/1988 | Hayden et al. |
| 4,784,034 | A | 11/1988 | Stones et al. |
| 4,798,001 | A | 1/1989 | Grossmann et al. |
| 4,893,411 | A | 1/1990 | Leini |
| 5,016,356 | A | 5/1991 | Trench |
| 5,018,421 | A | 5/1991 | Lucki et al. |
| D322,020 | S | 12/1991 | Grachan |
| 5,119,708 | A | 6/1992 | Musgrove |
| 5,517,889 | A | 5/1996 | Logan |
| 5,603,252 | A | 2/1997 | Hayden, Sr. |
| 5,803,678 | A | 9/1998 | Korb et al. |
| 5,855,158 | A | 1/1999 | Donofrio |
| D415,401 | S | 10/1999 | Imboden et al. |
| 6,003,422 | A | 12/1999 | Holston |
| 6,065,380 | A | 5/2000 | Lundh |
| D427,865 | S | 7/2000 | Mills, Jr. |
| 6,125,544 | A | 10/2000 | Eriksson et al. |
| 6,145,426 | A | 11/2000 | Ward et al. |
| 6,158,324 | A | 12/2000 | Kullmann et al. |
| 6,167,792 | B1 | 1/2001 | Korb et al. |
| 6,244,152 | B1 | 6/2001 | Di Nicolantonio |
| 6,276,248 | B1 | 8/2001 | Cranna |
| 6,339,843 | B1 | 1/2002 | Grilliot et al. |
| 6,357,123 | B1 | 3/2002 | Manuel |
| 6,401,585 | B1 | 6/2002 | Morgan |
| 6,532,855 | B1 | 3/2003 | Ward et al. |
| 6,599,063 | B1 * | 7/2003 | Capstran ............... 408/1 R |
| 6,601,495 | B2 | 8/2003 | Cranna |
| 6,782,781 | B2 | 8/2004 | Rack |
| 2002/0106254 | A1 * | 8/2002 | Rudolph ............... 408/204 |
| 2002/0184988 | A1 | 12/2002 | Rohman et al. |
| 2002/0194975 | A1 | 12/2002 | Bishop |
| 2003/0010179 | A1 | 1/2003 | McLuen |
| 2003/0024354 | A1 * | 2/2003 | Ward et al. ............... 76/58 |
| 2003/0051593 | A1 * | 3/2003 | Kocher et al. ............... 83/835 |
| 2003/0121388 | A1 | 7/2003 | Wheeler et al. |
| 2003/0192419 | A1 | 10/2003 | Conti |
| 2004/0221461 | A1 | 11/2004 | Knisley et al. |

FOREIGN PATENT DOCUMENTS

| | | |
|---|---|---|
| DE | 76 16 080 | 11/1976 |
| DE | 78 29 113 | 5/1980 |
| DE | 37 41 709 | 6/1989 |
| DE | 90 15 452 | 3/1991 |
| DE | 195 01 019 | 7/1996 |
| DE | 198 21 525 | 11/1998 |
| DE | 196 81 464 | 4/1999 |
| EP | 0 009 512 | 6/1982 |
| EP | 0 726 829 | 3/2000 |
| EP | 0 814 935 | 11/2001 |
| EP | 1 228 829 | 8/2002 |
| WO | WO 01/32340 | 5/2001 |
| WO | WO 02/06020 | 1/2002 |

* cited by examiner

US 7,658,136 B2

HOLE SAW BLADE

FIELD OF THE INVENTION

The present invention relates to cylindrical cutters and, more particularly, to a hole saw tooth form.

BACKGROUND OF THE INVENTION

Holesaws have been used in the construction industry for drilling holes that have a diameter of larger than 9/16 inch. Most commonly, holesaws are utilized for providing holes in electric panels and wood or metal studs. The holes must be drilled accurately and quickly. This enables the workpiece to be smooth around the area of the drilled hole.

Various types of holesaws exist in the art. U.S. Pat. No. 5,803,678 illustrates a holesaw. This holesaw includes raker teeth with a plurality of respective groups of saw teeth with each group having a tooth displaced further from the side than the other. While this saw appears to work satisfactorily for its intended purpose, designers strive to improve the art.

SUMMARY OF THE INVENTION

The present invention provides the art with a holesaw which reduces the moment and stress on the tooth. The present invention reduces the impact on the tooth by reducing the pitch between teeth. This also provides a larger number of teeth on smaller diameter bits. The present invention provide teeth with various gullet depth. The tooth pattern enables pairs of teeth to be provided with additional reinforcement.

According to one aspect of the invention, a holesaw comprises a cup shaped body with a base and a cutting edge. An arbor extends from the base. The plurality of teeth are formed on the cutting edge. The teeth include a first and second tooth form. The first tooth form has a first rake face on an angle from about 5° to 12°. A relief face is adjacent to the rake face to form a cutting edge. The relief face is at an angle of about 30° to 40°. A first gullet is continuous with the relief face. The gullet has a desired depth such that the first tooth form has a first height. The second tooth form has a second rake face continuous with a first gullet. The second rake face defines a rake angle from about 5° to 12°. The second relief face is adjacent the second rake face to form a cutting edge. The second relief face is on an angle from about 30° to 40°. The second gullet is continuous with the second relief face. The second gullet has a desired depth such that the second tooth form has a second tooth height. The second tooth height is greater than the first tooth height. Ordinarily, the first and second relief angles as well as the first and second rake angles are the same. The cutting edges of the first and second tooth forms are substantially at the same height. The first and second tooth forms form a repeating pattern with set or unset or both teeth. Ordinarily, the teeth can be arranged so that they are set inside outside or inside outside with one or two raker teeth between the inside and outside teeth.

According to the second aspect of the invention, a saw blade comprises teeth having first and second repeating tooth forms. The first tooth form has a first rake face on an angle from about 5° to 12°. A relief face is adjacent to the rake face to form a cutting edge. The relief face is at an angle of about 30° to 40°. A first gullet is continuous with the relief face. The gullet has a desired depth such that the first tooth form has a first height. The second tooth form has a second rake face continuous with a first gullet. The second rake face defines a rake angle from about 5° to 12°. The second relief face is adjacent the second rake face to form a cutting edge. The second relief face is on an angle from about 30° to 40°. The second gullet is continuous with the second relief face. The second gullet has a desired depth such that the second tooth form has a second tooth height. The second tooth height is greater than the first tooth height. Ordinarily, the first and second relief angles as well as the first and second rake angles are the same. The cutting edges of the first and second tooth forms are substantially at the same height. The first and second tooth forms form a repeating pattern with set or unset or both teeth.

From the following detailed description taken in conjunction with the accompanying drawings and claims, other objects and advantages of the present invention will be come apparent to those skilled in the art.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
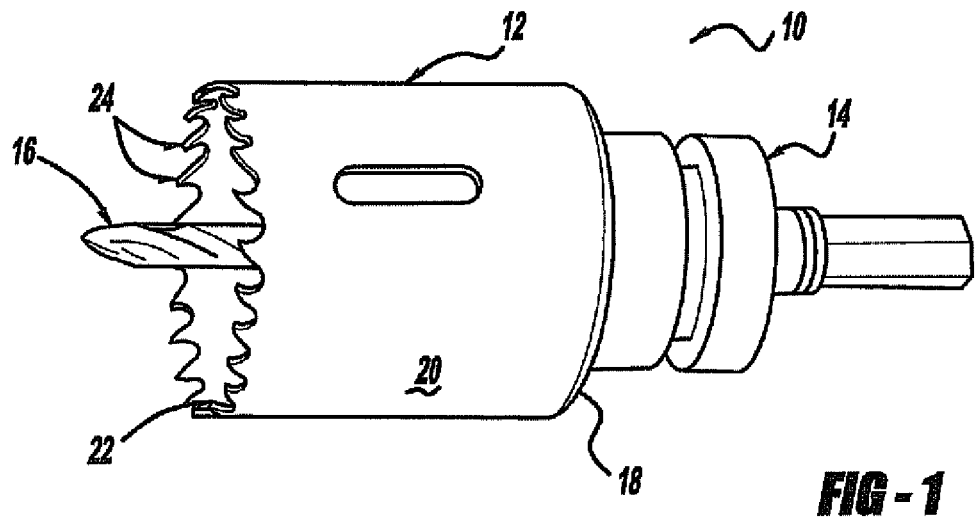
FIG. 1 is a perspective view of a holesaw in accordance with the present invention.

The following description of the preferred embodiment(s) is merely exemplary in nature and is in no way intended to limit the invention, its application, or uses.

Turning to the figures, a holesaw is illustrated and designated with the reference numeral 10. The holesaw 10 includes a cup shaped body 12, an arbor 14, and a drill bit 16. The arbor 14 as well as the drill bit 16 are like those conventionally used. The arbor 14 includes a bore to receive the drill bit 16 in a conventional way.

The body member 12 includes a base 18, a cylindrical wall 20 and a cutting edge 22. The base 18 includes an arbor aperture to receive the arbor 14. The cylindrical wall 20 can have a desired diameter and is usually formed such as by stamping with the base 18. The cutting edge 22 is at the end of the wall 20 extending away from the base 18.

The cutting edge 22 includes a plurality of teeth 24. The teeth 24 have a first tooth form 26 and a second tooth form 28.

Figure 2:
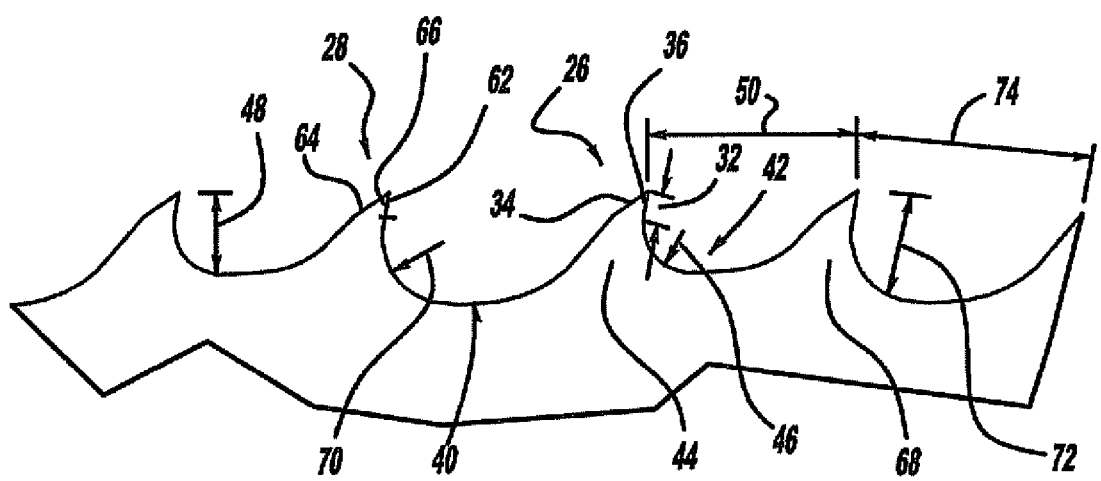
FIG. 2 is a side elevational view of a portion of the cutting edge of the holesaw of FIG. 1.

Turning to FIG. 2, an enlarged tooth form is illustrated. The first tooth form 26 has a rake face 32 and a relief face 34. The rake face is on a rake angle of about 5° to 12°. Preferably, the rake angle is about 10°. The rake face 32 has a tooth depth which is identified by the numeral 36. The relief face 34 is defined by a relief angle of between 30° to 40°, preferably, the relief angle is about 35°. The relief face is continuous with a curve portion 38 of the gullet 40. The gullet leads into the second tooth form 28.

The first tooth form 26 has a desired included angle of about 38° to 55° at the tip. The tooth form 26 has an additional base area 44 which increases the mass of the tooth 26, which, in turn, increases the strength of the tooth reducing the moment and stress in the tooth base 44. The first tooth form gullet 42 has a radius defined by the numeral 46. The first tooth form 26 depth and the gullet radius 46 define the maximum gullet depth or tooth height 48. The first pitch designated with the reference numeral 50 is the distance between the tip of the second tooth form 28 and the first tooth form 26.

The first tooth form depth is a length from the tip of the tooth to the curved portion of the gullet. The tooth depth has a length from about 18% to 24% of the tooth height or maximum gullet depth. Preferably, the tooth depth is about 21% of the tooth height or maximum gullet depth.

The gullet radius 46 has a length between about 53% to 65% of the length of the tooth height or maximum gullet depth. Preferably, the gullet radius 46 has a length of about between 53% and 54% of the length of the tooth height or maximum gullet depth. Also, the gullet radius is between about 18% to 25% of the length of the first pitch 50. Preferably, the gullet radius 46 is about 21% of the pitch 50.

The second tooth form 28 has a rake face 62 which is on a rake angle of from about 5° to 12°. Preferably, the rake angle is about 10°. The rake face 62 has a tooth depth identified by the numeral 66. The relief face 64 is defined by a relief angle of about 30° to 40°. Preferably, the relief angle is about 35°. The relief face is continuous with the curved portion of the gullet 42.

The tooth form has a desired included angle of between 38° to 55° at its tip. The included angle is preferably about 45°. Also, the tooth has an enlarged root area 68. The enlarged root area 68 increases the strength of the tooth. The increased strength reduces the moment and stress in the tooth base.

The gullet 40 has a radius defined by the numeral 70. The tooth depth 66 and the gullet depth 70 define the maximum gullet length or tooth length 72. The pitch designated with the reference numeral 74 is the distance between the tip of the first tooth form and the second tooth form.

The second tooth form depth 66 is a length from the tip of the tooth form 28 to the curved portion of the gullet 40. The tooth depth 66 has a length from about 30% to 40% of the tooth height or maximum gullet depth. Preferably, the tooth depth is about 30% of the tooth height or maximum gullet depth.

The gullet radius 70 has a length between about 55% to 65% of the length of the tooth height or maximum depth. Preferably, the gullet radius 70 length is about 54% of the length of the tooth height or maximum gullet length. Also, the gullet radius is between 10% to 25% the length of the pitch. Preferably, the gullet radius 70 is about 24% of the length of the pitch.

The repeating first tooth form second tooth form provides an increased root between adjacent large gullets 40. Thus, both teeth are reinforced on the large root portion between the two adjacent large gullets 40. Thus, the small gullet 42 which is behind each of the large teeth would reinforce the base of that tooth when it is exposed to higher impacts. The repeating pitch which have a different size, reduces the impact on the tooth during cutting. Also, the smaller pitch enables a larger number of teeth per inch on the hole saw specifically with smaller diameters.

Figure 3:
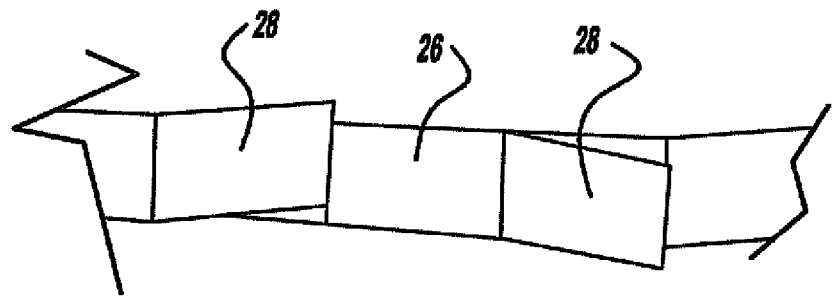
FIG. 3 is a plan view of a tooth pattern in accordance with the invention.
Figure 4:
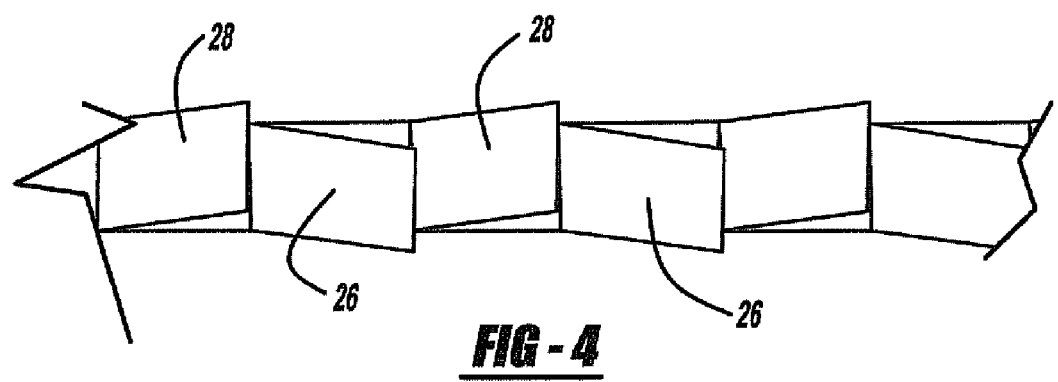
FIG. 4 is a second embodiment of a tooth pattern in accordance with present invention.
Figure 5:
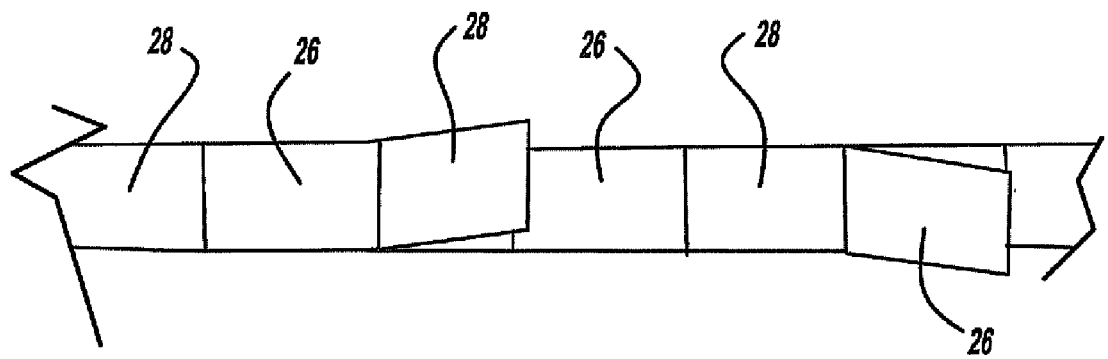
FIG. 5 is a plan view of a third embodiment of a tooth pattern of the present invention.

FIGS. 3-5 illustrate various types of offset patterns. In FIG. 3, the teeth are unset raker, inside, unset raker, outside, unset raker. In FIG. 4, the pattern is offset inside, outside, inside, outside. In FIG. 5, an additional pattern is shown. Here, the teeth pattern is unset raker, unset raker, inside, unset raker, unset raker, outside, unset raker, unset raker. Thus, while these provide optimal cutting, other designs could be used.

The present hole saw increases the cuts per blade. Also, the present holesaw decreases the cutting time to a particular material. Also, the present holesaw reduces the wear slope of the tooth of the saw blade. This means that during use, as the teeth wear, the slope or rake face angle of the tooth form varies less than from its original slope.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A holesaw comprising:
a cup shaped body having a base and a cutting edge;
an arbor extending from said base;
a plurality of teeth on said cutting edge, said plurality of teeth comprised of a plurality of repeating segments, each segment including only a first and second tooth form;
said first tooth form having a first gullet continuous with a first rake face on an angle from about 9° to about 12°; a first relief face adjacent said first rake face forming a first cutting edge; said first relief face at an angle of from about 30° to about 35°, and said first gullet having a desired depth such that said first tooth form has a first tooth height, said first gullet has a radius with a length between 53% to 56% of the first tooth height;
said second tooth form having a second gullet continuous with said first relief face and a second rake face, said second rake face defining a rake angle from about 9° to about 12°; and a second relief face adjacent said rake face forming a second cutting edge, said second relief face on an angle of about 30° to about 35°, and said second gullet having a desired depth such that said second tooth form has a second tooth height, said second gullet has a radius with a length between 54% to 56% of the second tooth height, wherein said second tooth height is greater than said first tooth height and tips of the cutting edges of said first and second tooth forms are along a common line.

2. The holesaw according to claim 1, wherein said first and second relief angle are the same.

3. The holesaw according to claim 1, wherein said first and second rake angles are the same.

4. The holesaw according to claim 1, wherein said repeating first and second tooth forms may be set or unset.

5. The holesaw according to claim 4, wherein said repeating first and second tooth forms are set inside and outside.

6. The holesaw according to claim 4, wherein said repeating first and second tooth forms are set inside, outside separated by one or more unset raker teeth.

7. The holesaw according to claim 1, wherein a pitch between first and second tooth forms is greater than pitch between second and first tooth forms.

8. A saw blade comprising: a cup shaped body having a base and a cutting edge; teeth on the cutting edge having only first and second repeating tooth forms;
said first tooth form having a first gullet continuous with a first rake face on angle from about 9° to about 12°; a first relief face adjacent said first rake face forming a first cutting edge; said first relief face at an angle of from about 30° to about 35°, said first gullet having a desired depth such that said first tooth form has a first tooth height, said first gullet has a radius with a length between 53% to 56% of the first tooth height;
said second tooth form having a second gullet continuous with said first relief face and a second rake face, said second rake face defining a rake angle from about 9° to about 12°; and a second relief face adjacent said rake face forming a second cutting edge, said second relief face on an angle of about 30° to about 35°, and said second gullet having a desired depth such that said second tooth form has a second tooth height, said second gullet has a radius with a length between 54% to 56% of the second tooth height, wherein said second tooth height is greater than said first tooth height and tips of the cutting edges of said first and second tooth forms are along a common line;

an increased root is formed between adjacent second gullets and both the first tooth form and the second tooth form between said adjacent second gullets are reinforced on the larger root positioned between said two adjacent second gullets.

9. The saw blade according to claim 8, wherein said first and second relief angle are the same.

10. The saw blade according to claim 8, wherein said first and second rake angles are the same.

11. The saw blade according to claim 8, wherein said repeating first and second tooth forms may be set or unset.

12. The saw blade according to claim 11, wherein said repeating first and second tooth forms are set left right left right.

13. The hole saw according to claim 11, wherein said repeating first and second tooth forms are set inside and outside.

14. The hole saw according to claim 8, wherein said repeating first and second tooth forms are set inside, outside separated by one or more unset raker teeth.

* * * * *

UNITED STATES PATENT AND TRADEMARK OFFICE
CERTIFICATE OF CORRECTION

PATENT NO. : 7,658,136 B2
APPLICATION NO. : 11/023122
DATED : February 9, 2010
INVENTOR(S) : Markus Rompel et al.

It is certified that error appears in the above-identified patent and that said Letters Patent is hereby corrected as shown below:

Column 6,
Line 8, "hole saw" should be -- saw blade --.
Line 11, "hole saw" should be -- saw blade --.

Signed and Sealed this

Twenty-seventh Day of April, 2010

David J. Kappos
*Director of the United States Patent and Trademark Office*